US010856100B2

(12) United States Patent
Ahn et al.

(10) Patent No.: US 10,856,100 B2
(45) Date of Patent: Dec. 1, 2020

(54) DYNAMIC GEOFENCES

(71) Applicant: American Express Travel Related Services Company, Inc., New York, NY (US)

(72) Inventors: John L. Ahn, New York City, NY (US); Ashish Bhaskar, New York, NY (US); Vasanth Dharmaraj, Princeton Junction, NJ (US); Jacob Duron, San Antonio, TX (US); James H. Graves, Hove (GB); Stewart M. Kendall, New York, NY (US); Brandon Leong, Rego Park, NY (US); Elmahdi Nahro, Guttenberg, NJ (US); Jimit Baldev Patel, Jersey City, NJ (US); Nishtha Patel, Fremont, CA (US); Ashish A. Pawale, Old Tappan, NJ (US); Pradeep Peethambaram, Phoenix, AZ (US); Jose Villegas, Brooklyn, NY (US); James Ware, Charlotte, NC (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/026,693

(22) Filed: Jul. 3, 2018

(65) Prior Publication Data
US 2020/0015034 A1    Jan. 9, 2020

(51) Int. Cl.
*H04W 4/021* (2018.01)
*H04W 60/04* (2009.01)
*H04W 4/02* (2018.01)

(52) U.S. Cl.
CPC ........... *H04W 4/021* (2013.01); *H04W 60/04* (2013.01); *H04W 4/023* (2013.01)

(58) Field of Classification Search
CPC .............................. H04W 4/021; H04W 60/04
See application file for complete search history.

(56) References Cited

U.S. PATENT DOCUMENTS

| | | | |
|---|---|---|---|
| 2011/0148626 A1* | 6/2011 | Acevedo | G01S 5/0027 340/539.13 |
| 2015/0031388 A1* | 1/2015 | Chatterjee | H04W 4/021 455/456.1 |
| 2015/0350827 A1* | 12/2015 | Birch | H04W 8/04 455/456.1 |
| 2017/0139934 A1* | 5/2017 | Laventman | G06F 17/3087 |
| 2017/0223497 A1* | 8/2017 | Wang | H04W 4/021 |
| 2018/0295564 A1* | 10/2018 | Madan | G06Q 20/3224 |
| 2018/0343538 A1* | 11/2018 | Bastide | H04W 4/021 |

* cited by examiner

Primary Examiner — Ernest G Tacsik
(74) Attorney, Agent, or Firm — Thomas Horstemeyer, LLP (57) ABSTRACT

A mobile device may identify nearby locations, such as locations of a merchant. The mobile device may create local geofences around the nearby locations. The mobile device may create an exit geofence which includes all of the local geofences. In response to the mobile device entering one of the local geofences, the mobile device may provide a notification regarding the location. In response to the mobile device leaving the exit geofence, the mobile device may identify nearby locations based on the new location of the mobile device, and the mobile device may create new local geofences for the current nearby locations, as well as a new exit geofence.

20 Claims, 3 Drawing Sheets

DYNAMIC GEOFENCES

FIELD

This disclosure generally relates to networks, and more particularly, to dynamically creating and updating geofences in a network.

BACKGROUND

Geofences are virtual geographic boundaries (that may be defined by, for example, GPS, RFID or other technology) that enable software to trigger a response in response to a mobile device entering, being within or leaving a particular area. Networks may include geofences for many different purposes. For example, a geofence may be created around a building which causes mobile phones to disable communications when entering the building for security purposes.

Maintaining multiple geofences on a mobile device uses processing power and decreases battery performance of the mobile device. Thus, device manufacturers (or operating system providers) may limit the number of geofences that an application running on the mobile device may maintain. However, in certain cases, it may be desirable for an application to create and maintain a number of geofences much greater than the allowed number, while also conserving battery performance and processing demands.

SUMMARY

Systems, methods, and articles of manufacture (collectively, the "system") for dynamically creating and updating geofences in a network are disclosed. The system may perform operations including initiating, by a mobile device, a geofence registration process; retrieving, by the mobile device, a current location of the mobile device; requesting, by the mobile device, a list of eligible locations; identifying, by the mobile device, the nearest N eligible locations from the list of eligible locations; generating, by the mobile device, a local geofence for each of the nearest N eligible locations; generating, by the mobile device, an exit geofence, wherein the local geofence for each of the nearest N eligible locations is located within the exit geofence; and restarting, by the mobile device, the geofence registration process, in response to the mobile device leaving the exit geofence.

In various embodiments, the exit geofence may be centered on the current location of the mobile device. A radius of the exit geofence may be equal to a distance between the mobile device and a farthest eligible location of the nearest N eligible locations. The operations may further comprise creating, by the mobile device, a notification request, wherein the notification request comprises a notification trigger and notification content. The notification trigger may instruct the mobile device to provide a notification in response to the mobile device entering one of the local geofences. The notification trigger may comprise a dwell time. The notification content May comprise a welcome message to the eligible location.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for dynamically creating and updating geofences are disclosed. A mobile application ("App") operating on a mobile device may obtain the location of the mobile device such as, for example, the GPS location of the mobile device. The App may generate a service call to retrieve a list of eligible locations. For example, the App may be for a transaction account issuer, and the eligible locations may be airport lounges which a user of the App is entitled to access based on the user's relationship with the transaction account issuer. The App may calculate the distance to the N closest eligible locations, where N represents a fixed number, such as ten.

The App may generate a local geofence around each of the N closest eligible locations. The geofences may be generated using operating system APIs or third-party APIs. In various embodiments, the geofences may be defined by latitude and longitude in decimal degrees on a World Geodetic System 1984 ("WGS84") ellipsoid and a radius in meters. However, other coordinates or distance units may be used in various embodiments. The App may calculate the distance from the mobile device to the farthest geofence location (e.g. the distance to the farthest eligible location, plus the radius of the local geofence around the farthest eligible location). The App may generate an exit geofence centered on the mobile device, having a radius equal to the distance to the farthest geofence location. In response to the mobile device entering a local geofence, the App may notify the user of the presence of the eligible location within the local geofence. In response to the user exiting the exit geofence, the App may recalculate the N closest eligible locations and create local geofences for the N closest eligible locations, as well as an exit geofence based on the current location of the mobile device. Thus, the App may use a small number of geofences at any given time, while allowing the App to create and maintain geofences for the most relevant eligible locations out of a large set of eligible locations at any given time.

This process improves the functioning of computer systems. For example, by utilizing a limited number of geofences at any given time, and updating the geofences based on the location of the mobile device, the mobile device is able to effectively create geofences for a vast number of locations, while only using the battery and processing requirements for the limited number of geofences.

The process may reduce the number of geofences that are set at a given time. The system may determine a location of the mobile device using multiple different sources, including GPS, cellular networks, WI-FI® communication technology access points, Bluetooth beacons, etc. Each source may use different radio hardware on the mobile device, which may each have different power needs. For example, GPS generally has the most complete coverage and is highly accurate, but also has relatively high power consumption. In order to conserve power, if the mobile device is far from all known geofences, the mobile device may use a tracking method which may be less accurate than GPS, but also less power consuming than GPS. During times when the mobile device is stationary, the operating system may use non-radio sensors to detect movement, such as the gyroscope or accelerometer, and turn off all radio-based location services until such time as the mobile device starts moving. This could save substantial amounts of battery life on the mobile device. By registering fewer geofences, the mobile device may be more likely to be in a state where there are no nearby geofences, and the operating system can take advantage of the aforementioned optimizations.

Additionally, as opposed to systems which may wake up an application and predetermined intervals, such as every 24 hours, in order to monitor for a change or reset a list, by waking the application only when the mobile device leaves the exit geofence, the mobile device may conserve battery by only waking the application when it is desirable to reset the list of nearby geofences.

Figure 1:
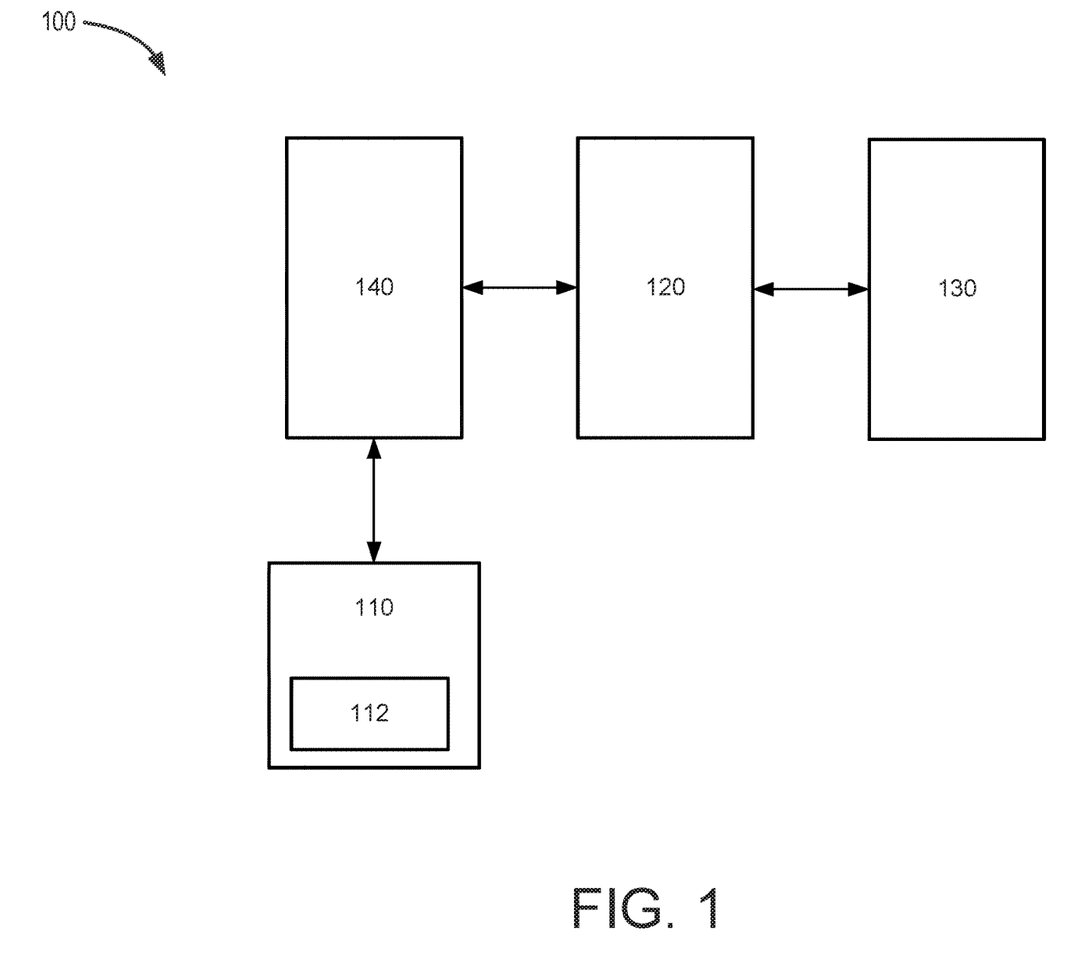
FIG. 1 illustrates a system for maintaining a dynamic network of geofences, in accordance with various embodiments.

Referring to FIG. 1, a system 100 for maintaining a dynamic network of geofences is illustrated according to various embodiments. The system 100 may comprise a mobile device 110. The mobile device 110 includes any device (e.g., smartphone) which communicates via any network, for example such as those discussed herein. Other types of mobile devices or systems may be used, including laptops, notebooks, tablets, hand held computers, personal digital assistants, set-top boxes, workstations, mini-computers, IPADS®, etc. The mobile device may utilize an operating system, such as iOS® or Android®.

The mobile device 110 may comprise a mobile application ("App") 112 stored on the mobile device 110. Mobile applications are typically deployed in the context of a mobile operating system, including for example, a WINDOWS® mobile operating system, an ANDROID® Operating System, APPLE® IOS®, and the like. The application may be configured to leverage the resources of the larger operating system and associated hardware via a set of predetermined rules which govern the operations of various operating systems and hardware resources. For example, where an application desires to communicate with a device or network other than the mobile device or mobile operating system, the application may leverage the communication protocol of the operating system and associated device hardware under the predetermined rules of the mobile operating system. Moreover, where the application desires an input from a user, the application may be configured to request a response from the operating system which monitors various hardware components and then communicates a detected input from the hardware to the application. The application may also leverage hardware and application programming interfaces on the mobile device 110 in order to retrieve information about the mobile device 110, such as a current geolocation of the mobile device 110.

The system 100 may comprise an application server 120. In various embodiments, the servers described herein may include application servers (e.g. WEB SPHERE, WEB LOGIC, JBOSS, EDB® Postgres Plus Advanced Server® (PPAS), etc.). In various embodiments, the servers may include web servers (e.g. APACHE, IIS, GWS, SUN JAVA® SYSTEM WEB SERVER, JAVA Virtual Machine running on LINUX or WINDOWS).

Practitioners will appreciate that the mobile device 110 may or may not be in direct contact with an application server. For example, a mobile device may access the services of an application server through another server and/or hardware component, which may have a direct or indirect connection to an Internet server. For example, a mobile device may communicate with an application server via a load balancer. In various embodiments, access is through a network or the Internet through a commercially-available web-browser software package.

The system 100 may comprise a location system 130. The location system 130 may comprise one or more databases or servers which store information regarding eligible locations, such as latitude and longitude coordinates, name, and geofence radius. In various embodiments, the location database may be operated by an entity which stores information regarding airport lounges, such as LoungeBuddy, Inc.

The system 100 may comprise a communication network 140. In various embodiments, the communication network 140 may be operated by a telecommunications carrier, such as Verizon Wireless®. The communication network 140 may comprise a variety of hardware, such as satellites and cellular towers. In various embodiments, the communication network 140 may provide geolocation information to the mobile device 110. In various embodiments, the mobile device 110 may communicate with the application server 120 and/or the location system 130 via the communication network 140.

Figure 2:
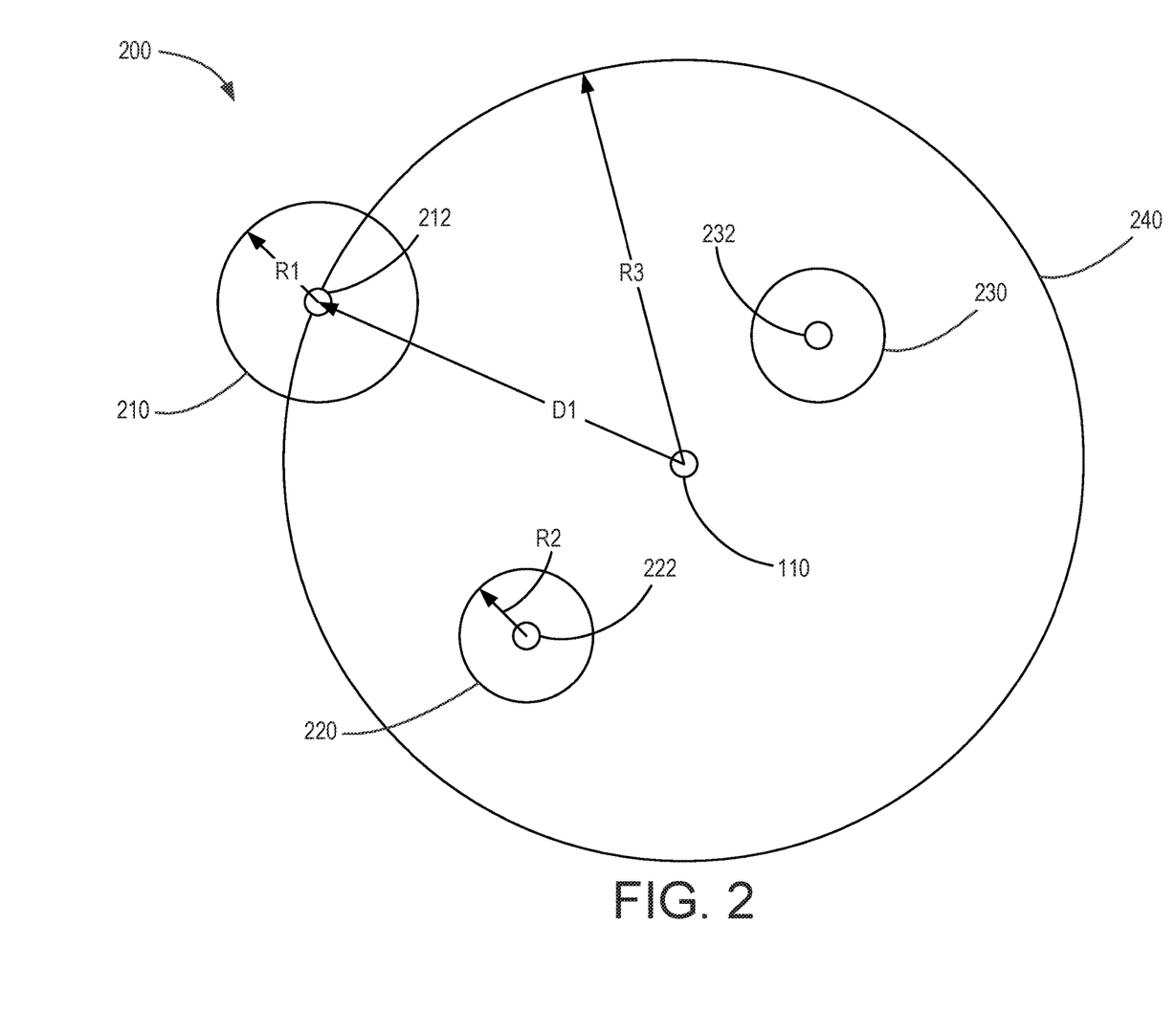
FIG. 2 illustrates a geofence map, in accordance with various embodiments.

Referring to FIG. 2, a geofence map 200 is illustrated according to various embodiments. The mobile device 110 may create geofences for the nearest N eligible locations. As shown, N=3 in the geofence map 200. However, in various embodiments the value of N may be set to any desired number. In various embodiments, the value of N may be based on a maximum allowable number of geofences for the operating system on the mobile device 110 at any given time. In various embodiments, N may vary depending on the eligible locations (e.g., density of eligible locations), type of device, battery power of device, geographic location, time of day, type of user, day of week, time of year, purchase history, recent purchases, and/or the like.

The geofence map 200 may comprise a first local geofence 210 for a first eligible location 212, a second local geofence 220 around a second eligible location 222, and a third local geofence 230 around a third eligible location 232. As used herein, a "local geofence" refers to a geofence associated with a specific eligible location. In various embodiments, the geofences may be any shape (e.g., circular) and associated in any way with the location (e.g., centered on the associated eligible location). In various embodiments, each local geofence may comprise a tag or name, such as Airport1, Airport2, and Airport3. In various embodiments, the App may apply a fixed radius for each local geofence, such as one kilometer around the eligible location. However, in various embodiments, each local geofence may comprise a radius which may be the same distance or different distances than other local geofences. For example, Airport1 may represent a large airport, and the first local geofence 210 may have a radius R1 of two kilometers. However, Airport2 may represent a small airport, and the second local geofence 220 may have a radius of five hundred meters.

The App may create an exit geofence 240 centered on the mobile device 110. The radius R3 of the exit geofence 240 may be equal to the distance D1 from the mobile device 110 to the farthest away eligible location. Thus, each of the N nearest eligible locations may be located within the exit geofence 240.

In various embodiments, the radius R3 of the exit geofence 240 may be equal to the sum of the distance D1 from the mobile device 110 to the farthest away eligible location, in the illustrated case first eligible location 212, plus the radius R1 of the farthest away eligible location. Thus, each local geofence may be completely contained within the exit geofence 240. However, in various embodiments, the radius of the exit geofence 240 may be set to a fixed distance or any other desired distance.

Figure 3:
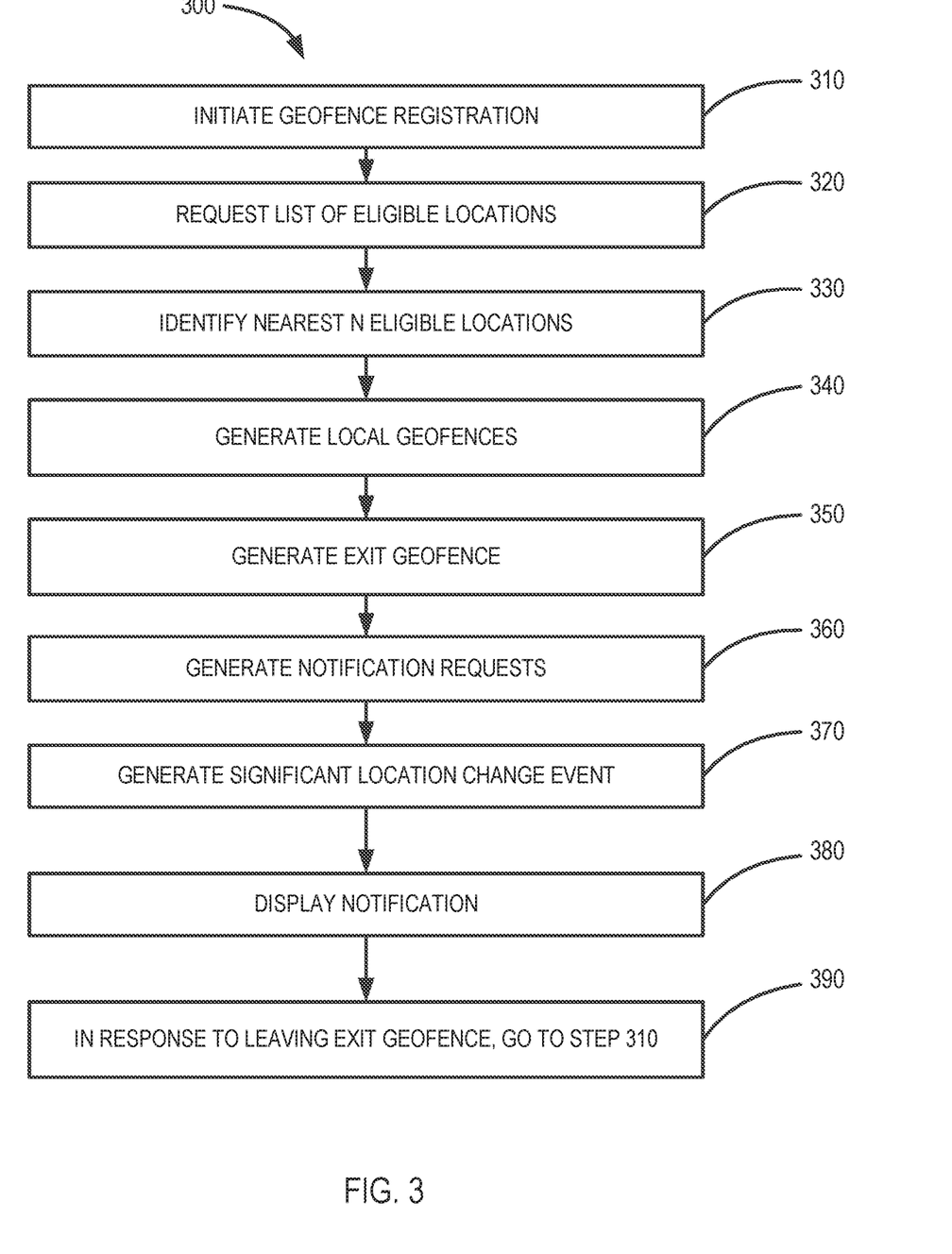
FIG. 3 illustrates a flowchart of a process for maintaining a dynamic network of geofences, in accordance with various embodiments.

Referring to FIG. 3, a flowchart 300 of a process for maintaining a dynamic network of geofences is illustrated, according to various embodiments. The mobile device may initiate a geofence registration process for the mobile device (step 310). The process may be triggered by one or more different actions. For example, the registration process may be triggered in response to a user selecting to enroll in the dynamic geofence system, or as part of enrolling or using another system. The registration process may be triggered in response to a user turning on notifications, such as by switching a toggle. The registration process may be triggered in response to the mobile device leaving an exit geofence.

Once the registration process is initiated, an App on the mobile device may obtain the current location of the mobile device (step 310). For example, the current location may be expressed as latitude and longitude coordinates, or any other suitable locating method.

The mobile device may request a list of all eligible locations (step 320). In various embodiments, a location database may be updated in real time, as eligible locations are added or removed. The request may be transmitted by the App as an API call to the location database. The request may be transmitted via an application server. The App may store the eligible locations in a cache on the mobile device. Each eligible location may include data such as name, location coordinates, and geofence radius.

The mobile device may identify the nearest N eligible locations (step 330). In various embodiments, the mobile device may calculate the distance from the mobile device to each eligible location and select the N eligible locations with the smallest distances. The distance may be calculated as the length of a great circle path (i.e. as the crow flies) between latitude and longitude points along an ellipsoid representation of the Earth. The calculation may be made utilizing an operating system API. For example, for mobile devices using an Android® operating system, an Android® OS API may be used to calculate the distance which uses the WGS84 ellipsoid. Those skilled in the art will appreciate that there are many third-party APIs and algorithms which may be utilized to calculate distances. In various embodiments, the eligible locations may be divided into regions. The distance calculations may be performed from the mobile device to the eligible locations in the immediate region, or the immediate region and adjacent regions. Thus, in various embodiments, rather than calculating the distance to every eligible location, the distance may be calculated for the subset of eligible locations which are near the mobile device, which may reducing processing and data transmission demands.

In various embodiments, the mobile device may transmit the location of the mobile device to the application server or any other node in the system. The distance calculations may be performed by any node in the system, and the node may transmit the N nearest geofences, including the center points and radii, to the mobile device, which may then be utilized by the mobile device to perform the processes described herein.

The mobile device may generate a local geofence for each of the nearest N eligible locations (step 340). The local geofences may be circular regions centered on the location coordinates and having a radius of the geofence radius provided by the location database. However, in various embodiments, the App may generate local geofences with a default radius, such as five hundred meters. In various embodiments, the App may establish one or more of the radii based on the eligible locations (e.g., density of eligible locations), type of device, battery power of device, geographic location, time of day, type of user, day of week, time of year, purchase history, recent purchases, and/or the like.

The mobile device may generate an exit geofence (step 350). The exit geofence may be centered on the mobile device and have a radius equal to the distance to the farthest local geofence location. In various embodiments, the exit geofence radii may be based on the eligible locations (e.g., density of eligible locations), type of device, battery power of device, geographic location, time of day, type of user, day of week, time of year, purchase history, recent purchases, and/or the like.

The App may generate a notification request for each of the nearest N eligible locations (step 360). Each notification request may comprise a notification trigger and notification content. The notification trigger may indicate that a notification should be provided in response to the mobile device entering a local geofence. The notification content may define the content of the notification, such as "Welcome to Airport1," where Airport1 is the name of the eligible location within the local geofence. The notification content may also include details about the eligible location, such as lounge name, available services, prices, menus, contact information, directions, etc. In various embodiments, the notification content may provide a link to chat with a person or machine at the eligible location, or the notification content may provide a link to create a reservation, or check-in on social media. The system may notify various friends of the user on social media about the user's location. The notification content may also include a special offer which may be tailored to the user based on the user's association with the provider of the App, such as a discount on services at the eligible location based on a premier status of the user. The offer may also be based on type of device, geographic location, time of day, type of user, day of week, time of year, purchase history, recent purchases, and/or the like.

In various embodiments, the notification trigger may include a dwell time. The dwell time may be a minimum time that the mobile device must be located within the local geofence before the notification request is triggered. For example, the dwell time may be equal to five minutes, and the notification request may be triggered after the mobile device is located with the local geofence for greater than five minutes. The dwell time may prevent notification requests from being unnecessarily triggered if a user is quickly passing by an eligible location without intending to visit the eligible location, such as if a user drives near an airport but does not stop at the airport.

The mobile device may generate a significant location change event (step 370). The significant location change event may be triggered in response to the mobile device leaving the exit geofence.

In response to the mobile device entering one of the local geofences, the mobile device may display a notification (step 380). The notification may display the notification content.

In response to the mobile device leaving the exit geofence, the operating system on the mobile device may wake up the App. The App may remove all previously stored notification requests. The App may then restart the geofence registration process (step 390). If the App is not able to obtain a current list of eligible locations, the App may use the cached list of eligible locations for the geofence registration process.

Thus, although the App may utilize only N+1 geofences (N geofences plus the exit geofences) at any given time, the App may update the current geofences based on the location of the mobile device in order to provide relevant information to the user. In various embodiments, depending on the value of N and the density of eligible locations, the radius of the exit geofence may be hundreds of kilometers or more, which may result in the geofences registration process being initiated only in circumstances where the user travels over large distances.

Although described primarily with reference to airports and airport lounges, the present dynamic geofence process may be utilized with any locations which may benefit from notifying nearby users, such as restaurants, schools, government buildings, merchants, emergency services, etc.

The claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include waking an inactive application on a mobile device. The system may include generating customized information and alerting a user that information can be accessed from their mobile device. The alerts are generated by filtering received information, building information alerts and formatting the alerts into data blocks based upon user preference information. The data blocks are transmitted to the user's mobile device which may cause the mobile device to auto-launch an application to display the information alert and provide access to more detailed information about the information alert. More particularly, the method may comprise providing a viewer application to a user on the mobile device; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information, which specifies the location of the data source; formats the information alert into data blocks according to said information format; and transmits the formatted information alert over a wireless communication channel to a mobile device associated with the user based upon the destination address and transmission schedule, wherein the alert activates the application to cause the information alert to display on the mobile device and to enable connection via the URL to the data source over the Internet.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via a software enabled link, wherein the link may be sent via an email, text, post, social network input and/or any other method known in the art.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Tony, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

What is claimed is:

1. A method, comprising:
   selecting, by a mobile device, a plurality of eligible first locations within a first defined proximity to a first location of the mobile device from a list of eligible first locations, wherein the list of eligible first locations comprises a first plurality of accessible locations to the mobile device based at least in part on a user account of an application executed on the mobile device;
   determining, by the mobile device, a radius for a first geofence for the plurality of eligible first locations based at least in part on an amount of power in a battery for the mobile device;
   generating, by the mobile device, the first geofence for individual ones of the plurality of eligible first locations based at least in part on the radius;
   generating, by the mobile device, an exit geofence, wherein the first geofence for the plurality of eligible first locations is located within the exit geofence; and
   generating, by the mobile device using the application, a second geofence for individual ones of a plurality of eligible second locations within a second defined proximity to an exit location in response to the mobile device exiting the exit geofence, the plurality of eligible second locations being generated from a list of eligible second locations, and the list of eligible second locations comprising a second plurality of accessible locations to the mobile device based at least in part on the user account of the application.

2. The method of claim 1, wherein the exit geofence is centered on the first location of the mobile device.

3. The method of claim 2, wherein the radius comprises a first radius, and a second radius of the exit geofence is equal to a distance between the mobile device and a farthest eligible first location of the plurality of eligible first locations.

4. The method of claim 1, further comprising creating, by the mobile device, a notification request for a respective eligible first location of the plurality of eligible first locations, wherein the notification request comprises a notification trigger and notification content.

5. The method of claim 4, wherein the notification trigger instructs the mobile device to provide a notification in response to the mobile device entering the first geofence.

6. The method of claim 5, wherein the notification trigger comprises a dwell time, wherein the notification is provided after an expiration of the dwell time.

7. The method of claim 4, wherein the notification content comprises a welcome message to the respective eligible first location.

8. A mobile device comprising:
   a processor; and
   a tangible, non-transitory memory configured to communicate with the processor,
   the tangible, non-transitory memory having instructions stored thereon that, in response to execution by the processor, cause the processor to perform operations comprising:
   selecting, by the processor, a plurality of eligible first locations within a first defined proximity to a first location of the mobile device from a list of eligible first locations, wherein the list of eligible first locations comprises a first plurality of accessible locations to the mobile device based at least in part on a user account of an application executed on the mobile device;
   determining, by the processor, a radius for a first geofence for the plurality of eligible first locations based at least in part on an amount of power in a battery for the mobile device;
   generating, by the processor, the first geofence for individual ones of the plurality of eligible first locations based at least in part on the radius;
   generating, by the processor, an exit geofence, wherein the first geofence for the plurality of eligible first locations is located within the exit geofence; and
   generating, by the processor using the application, a second geofence for individual ones of a plurality of eligible second locations within a second defined proximity to an exit location in response to the mobile device exiting the exit geofence, the plurality of eligible second locations being generated from a list of eligible second locations, and the list of eligible second locations comprising a second plurality of accessible locations to the mobile device based at least in part on the user account of the application.

9. The mobile device of claim 8, wherein the instructions further cause the processor to perform operations comprising activating, by the processor, the application on the mobile device in response to receiving a notification trigger associated with the mobile device entering the first geofence.

10. The mobile device of claim 8, the instructions further cause the processor to perform operations comprising retrieving, by the processor, the first location of the mobile device.

11. The mobile device of claim 8, wherein the plurality of eligible second locations are further generated based at least in part on a plurality of characteristics, the plurality of characteristics include at least one of: a device type of the mobile device, a geographic location of the mobile device, a time of day, a type of the user account of the mobile device, a day of week, or a time of year.

12. The mobile device of claim 8, the instructions further cause the processor to perform operations comprising acquiring, by the processor using the application, the list of eligible second locations.

13. The mobile device of claim 8, the instructions further cause the processor to perform operations comprising removing, by the processor, a notification request previously stored in the mobile device in response to the mobile device exiting the exit geofence.

14. The mobile device of claim 8, the instructions further cause the processor to perform operations comprising requesting, by the processor, the list of eligible second locations.

15. An article of manufacture including a non-transitory, tangible computer readable storage medium having instructions stored thereon that, in response to execution by a mobile device, cause the mobile device to perform operations comprising:
- selecting, by the mobile device, a plurality of eligible first locations within a first defined proximity to a first location of the mobile device from a list of eligible first locations, wherein the list of eligible first locations comprises a first plurality of accessible locations to the mobile device based at least in part on a user account of an application executed on the mobile device;
- determining, by the mobile device, a radius for a first geofence for the plurality of eligible first locations based at least in part on an amount of power in a battery for the mobile device;
- generating, by the mobile device, the first geofence for individual ones of the plurality of eligible first locations based at least in part on the radius;
- generating, by the mobile device, an exit geofence, wherein the first geofence for the plurality of eligible first locations is located within the exit geofence; and
- generating, by the mobile device using the application, a second geofence for individual ones of a plurality of eligible second locations within a second defined proximity to an exit location in response to the mobile device exiting the exit geofence, the plurality of eligible second locations being generated from a list of eligible second locations and the list of eligible second locations comprising a second plurality of accessible locations to the mobile device based at least in part on the user account of the application.

16. The article of manufacture of claim 15, wherein the exit geofence is centered on the first location of the mobile device.

17. The article of manufacture of claim 16, wherein the radius comprises a first radius, and a second radius of the exit geofence is equal to a distance between the mobile device and a farthest eligible first location of the plurality of eligible first locations.

18. The article of manufacture of claim 15, wherein the instructions further cause the mobile device to perform operations comprising creating, by the mobile device, a notification request for at least one of the plurality of eligible first locations, wherein the notification request comprises a notification trigger and notification content.

19. The article of manufacture of claim 18, wherein the notification trigger instructs the mobile device to provide a notification in response to the mobile device entering the first geofence.

20. The article of manufacture of claim 15, wherein determining the radius for the first geofence for the plurality of eligible first locations is further based at least in part on a purchase history of the user account of the mobile device.

* * * * *